United States Patent [19]
Williams et al.

[11] Patent Number: 5,586,061
[45] Date of Patent: Dec. 17, 1996

[54] TEMPERATURE VALIDATION METHOD FOR TEMPERATURE-CONTROLLING AND TEMPERATURE-MONITORING SYSTEMS

[75] Inventors: Matthew R. Williams, Hatboro; Michael A. Crusi, Roslyn, both of Pa.

[73] Assignee: Mack Information Sytems, Inc., Wyncote, Pa.

[21] Appl. No.: 394,437

[22] Filed: Feb. 24, 1995

[51] Int. Cl.⁶ ............................................. G01K 15/00
[52] U.S. Cl. .................. 364/557; 304/550; 304/571.01; 304/571.03; 304/579
[58] Field of Search .............................. 364/557, 571.01, 364/571.03, 579, 550; 374/15, 107, 137

[56] References Cited

U.S. PATENT DOCUMENTS

| | | | |
|---|---|---|---|
| 2,026,801 | 1/1936 | Ross | 119/35 |
| 2,854,844 | 10/1958 | Howell | 73/1 |
| 3,033,968 | 5/1962 | Julie | 219/20 |
| 3,067,604 | 12/1962 | Brunson | 73/1 |
| 3,757,207 | 9/1973 | Hire | 324/417 |
| 4,433,924 | 2/1984 | Quinn, III | 374/2 |
| 4,492,336 | 1/1985 | Takata et al. | 236/20 A |
| 4,702,305 | 10/1987 | Beckey et al. | 165/12 |
| 4,702,620 | 10/1987 | Ford | 374/145 |
| 4,848,925 | 7/1989 | Jacques | 374/145 |
| 4,892,830 | 1/1990 | Findley et al. | 435/290 |
| 4,899,297 | 2/1990 | Sano et al. | 364/557 |
| 5,123,477 | 6/1992 | Tyler | 364/557 |

*Primary Examiner*—Emanuel T. Voeltz
*Assistant Examiner*—Hien Vo
*Attorney, Agent, or Firm*—Miller & Christenbury

[57] ABSTRACT

A method is provided for validating, at a pre-determined test temperature, the operation of a temperature sensor, controller or monitor in a temperature-controlling device having a temperature-controlled environment to be maintained at a target temperature. A standardized temperature sensor is positioned within the temperature-controlled environment. A thermal mass having a temperature different from the target temperature is provided and placed within the environment. The temperature of the environment is caused to deviate from the target temperature in response to the thermal mass. A comparison between the temperature indicated by the sensor, controller or monitor and the temperature indicated by the standardized sensor is made when the temperature of the environment corresponds to the test temperature. A method is also provided for calibrating the sensor, controller or monitor if the temperature reported by the sensor, controller or monitor does not correspond within a pre-determined tolerance to the temperature reported by the standardized sensor.

18 Claims, 8 Drawing Sheets

```
┌─────────────────────────────────────────────┐
│    PLACE STANDARDIZED TEMPERATURE           │
│ SENSOR WITHIN TEMPERATURE-CONTROLLED        │
│      OR TEMPERATURE-MONITORED               │
│     ENVIRONMENT OF HEATING DEVICE           │
└─────────────────────────────────────────────┘
                     ↓
┌─────────────────────────────────────────────┐
│  ENERGIZE HEATING DEVICE AND RUN UNTIL      │
│   STABLE TEMPERATURE IS ESTABLISHED IN      │
│       TEMPERATURE-CONTROLLED OR             │
│   TEMPERATURE-MONITORED ENVIRONMENT         │
└─────────────────────────────────────────────┘
                     ↓
┌─────────────────────────────────────────────┐
│   DE-ENERGIZE HEATING DEVICE AND ALLOW      │
│      TEMPERATURE WITHIN TEMPERATURE-        │
│  CONTROLLED OR TEMPERATURE-MONITORED        │
│       ENVIRONMENT TO FALL BELOW Tmin        │
└─────────────────────────────────────────────┘
                     ↓
┌─────────────────────────────────────────────┐
│   COMPARE Ta WITH Ts AT MOMENT WHEN         │
│              Ta = Tmin                      │
└─────────────────────────────────────────────┘
                     ↓
┌─────────────────────────────────────────────┐
│   RE-ENERGIZE HEATING DEVICE AND RUN        │
│       UNTIL STABLE TEMPERATURE IS           │
│        ESTABLISHED IN TEMPERATURE-          │
│  CONTROLLED OR TEMPERATURE-MONITORED        │
│               ENVIRONMENT                   │
└─────────────────────────────────────────────┘
                     ↓
┌─────────────────────────────────────────────┐
│      PROVIDE THERMAL MASS WITH              │
│     TEMPERATURE EXCEEDING Tmax              │
└─────────────────────────────────────────────┘
                     ↓
┌─────────────────────────────────────────────┐
│       PLACE THERMAL MASS WITHIN             │
│       TEMPERATURE-CONTROLLED OR             │
│  TEMPERATURE-MONITORED ENVIRONMENT          │
│           OF HEATING DEVICE                 │
└─────────────────────────────────────────────┘
                     ↓
┌─────────────────────────────────────────────┐
│     ALLOW TEMPERATURE WITHIN                │
│      TEMPERATURE-CONTROLLED OR              │
│  TEMPERATURE-MONITORED ENVIRONMENT          │
│ TO EXCEED Tmax IN RESPONSE TO THERMAL       │
│                MASS                         │
└─────────────────────────────────────────────┘
                     ↓
┌─────────────────────────────────────────────┐
│   COMPARE Ta WITH Ts AT MOMENT WHEN         │
│              Ta = Tmax                      │
└─────────────────────────────────────────────┘
```

FIG. 5

```
┌─────────────────────────────────────────────┐
│       PLACE STANDARDIZED TEMPERATURE        │
│ SENSOR WITHIN TEMPERATURE-CONTROLLED        │
│      OR TEMPERATURE-MONITORED               │
│      ENVIRONMENT OF COOLING DEVICE          │
└─────────────────────────────────────────────┘
                      ↓
┌─────────────────────────────────────────────┐
│   ENERGIZE COOLING DEVICE AND RUN UNTIL     │
│  STABLE TEMPERATURE IS ESTABLISHED IN       │
│        TEMPERATURE-CONTROLLED OR            │
│   TEMPERATURE-MONITORED ENVIRONMENT         │
└─────────────────────────────────────────────┘
                      ↓
┌─────────────────────────────────────────────┐
│   DE-ENERGIZE COOLING DEVICE AND ALLOW      │
│      TEMPERATURE WITHIN TEMPERATURE-        │
│ CONTROLLED OR TEMPERATURE-MONITORED         │
│         ENVIRONMENT TO EXCEED Tmax          │
└─────────────────────────────────────────────┘
                      ↓
┌─────────────────────────────────────────────┐
│   COMPARE Ta WITH Ts AT MOMENT WHEN         │
│               Ta = Tmax                     │
└─────────────────────────────────────────────┘
                      ↓
┌─────────────────────────────────────────────┐
│   RE-ENERGIZE COOLING DEVICE AND RUN        │
│ UNTIL STABLE TEMPERATURE IS ESTABLISHED     │
│        IN TEMPERATURE-CONTROLLED OR         │
│   TEMPERATURE-MONITORED ENVIRONMENT         │
└─────────────────────────────────────────────┘
                      ↓
┌─────────────────────────────────────────────┐
│        PROVIDE THERMAL MASS WITH            │
│         TEMPERATURE BELOW Tmin              │
└─────────────────────────────────────────────┘
                      ↓
┌─────────────────────────────────────────────┐
│       PLACE THERMAL MASS WITHIN             │
│        TEMPERATURE-CONTROLLED OR            │
│ TEMPERATURE-MONITORED ENVIRONMENT OF        │
│              COOLING DEVICE                 │
└─────────────────────────────────────────────┘
                      ↓
┌─────────────────────────────────────────────┐
│     ALLOW TEMPERATURE WITHIN                │
│       TEMPERATURE- CONTROLLED OR            │
│   TEMPERATURE-MONITORED ENVIRONMENT         │
│    TO FALL BELOW Tmin IN RESPONSE TO        │
│              THERMAL MASS                   │
└─────────────────────────────────────────────┘
                      ↓
┌─────────────────────────────────────────────┐
│   COMPARE Ta WITH Ts AT MOMENT WHEN         │
│               Ta = Tmin                     │
└─────────────────────────────────────────────┘
```

FIG. 6

TEMPERATURE VALIDATION METHOD FOR TEMPERATURE-CONTROLLING AND TEMPERATURE-MONITORING SYSTEMS

BACKGROUND OF THE INVENTION

This invention relates to a method for testing the performance of heating and cooling devices. More specifically, it relates to a method for verifying the calibration of temperature sensors in temperature-controlling and temperature-monitoring systems.

FIELD OF THE INVENTION

There exist many devices designed to maintain one or more specific temperatures or pre-determined temperature ranges. Some heat a space or a material and maintain an elevated temperature or temperature range. Examples of heating devices include general purpose ovens, heat lamps and other common appliances as well as precision temperature control units such as incubators and process equipment.

Other devices maintain sub-ambient temperatures or temperature ranges. Examples of cooling devices include common refrigerators and freezers as well as precision temperature control units for cryogenic and critical process applications.

Heating and cooling devices often include a temperature-controlling system. Such temperature-controlling systems generally include one or more temperature sensors to measure the temperature of a space or material as well as a heat transfer device for adding heat to, or removing heat from, the space or material.

Many heating and cooling devices also include an independent temperature-monitoring system to periodically or continuously monitor the temperature of the space or material and notify a system operator if the temperature deviates from a pre-determined value or range. Such monitoring systems generally include one or more temperature sensors and a display, recorder, alarm or other means for notifying a system operator.

It is important to periodically verify the performance of temperature-controlling and temperature-monitoring systems to ensure operation at pre-determined temperatures or temperature ranges and within pre-determined tolerances. This is particularly true for precision heating and cooling devices used in critical applications.

A key factor in accurate temperature control and monitoring is accurate temperature sensing. Accordingly, periodic validation of temperature sensor calibration is required to ensure proper control and monitoring at critical temperatures.

A problem occurs when the temperature within a heating or cooling device is intentionally altered to validate sensor operation by altering the device's normal operation. For example, changing the thermostat setting of a thermostat-controlled device to test a sensor at an alarm temperature invalidates the original calibration of the thermostat and requires recalibration of the thermostat after the test. Such a procedure is tedious and undesirable.

Similarly, removal of the temperature sensor or sensors from the heating or cooling device for emersion in a temperature-controlled environment is disadvantageous. Sensor removal precludes testing under actual process conditions. Also, sensor removal increases the risk of sensor damage and is cumbersome, labor-intensive and prone to operator error.

OBJECTS OF THE INVENTION

It is an object of this invention to provide a method for validating proper operation of temperature-controlling and temperature-monitoring systems that overcomes the problems associated with prior art methods.

It is another object of this invention to provide a validation method performed under actual process conditions.

Another object of this invention is to provide an efficient method for calibrating temperature-controlling and temperature-monitoring systems.

It is another object of this invention to provide a method for validating the calibration of temperature sensors at specific temperatures.

Other objects will become apparent to one of ordinary skill in the art in view of the descriptions that follow.

SUMMARY OF THE INVENTION

This invention provides a validation method for temperature-controlling and temperature-monitoring systems used in heating and cooling devices. The method is performed by introducing a thermal mass into the temperature-controlled or temperature-monitored environment of the device to temporarily create a thermal gradient. A standardized temperature sensor is also placed within the temperature-controlled or temperature-monitored environment to sense the actual temperature within the environment.

The standardized temperature sensor output is compared to the output of the temperature sensor or sensors that are a part of the temperature-controlling or temperature-monitoring system under test. This comparison is performed at one or more temperatures to validate sensor calibration. The sensors are calibrated or re-calibrated as necessary.

BRIEF DESCRIPTION OF THE DRAWINGS

FIG. 5 is a flow diagram illustrating the steps of an embodiment of the method adapted for testing minimum and maximum temperature limits of a target temperature range in a heating device.

FIG. 6 is a flow diagram illustrating the steps of an embodiment of the method adapted for testing minimum and maximum temperature limits of a target temperature range in a cooling device.

DETAILED DESCRIPTION OF THE INVENTION

Figure 1:
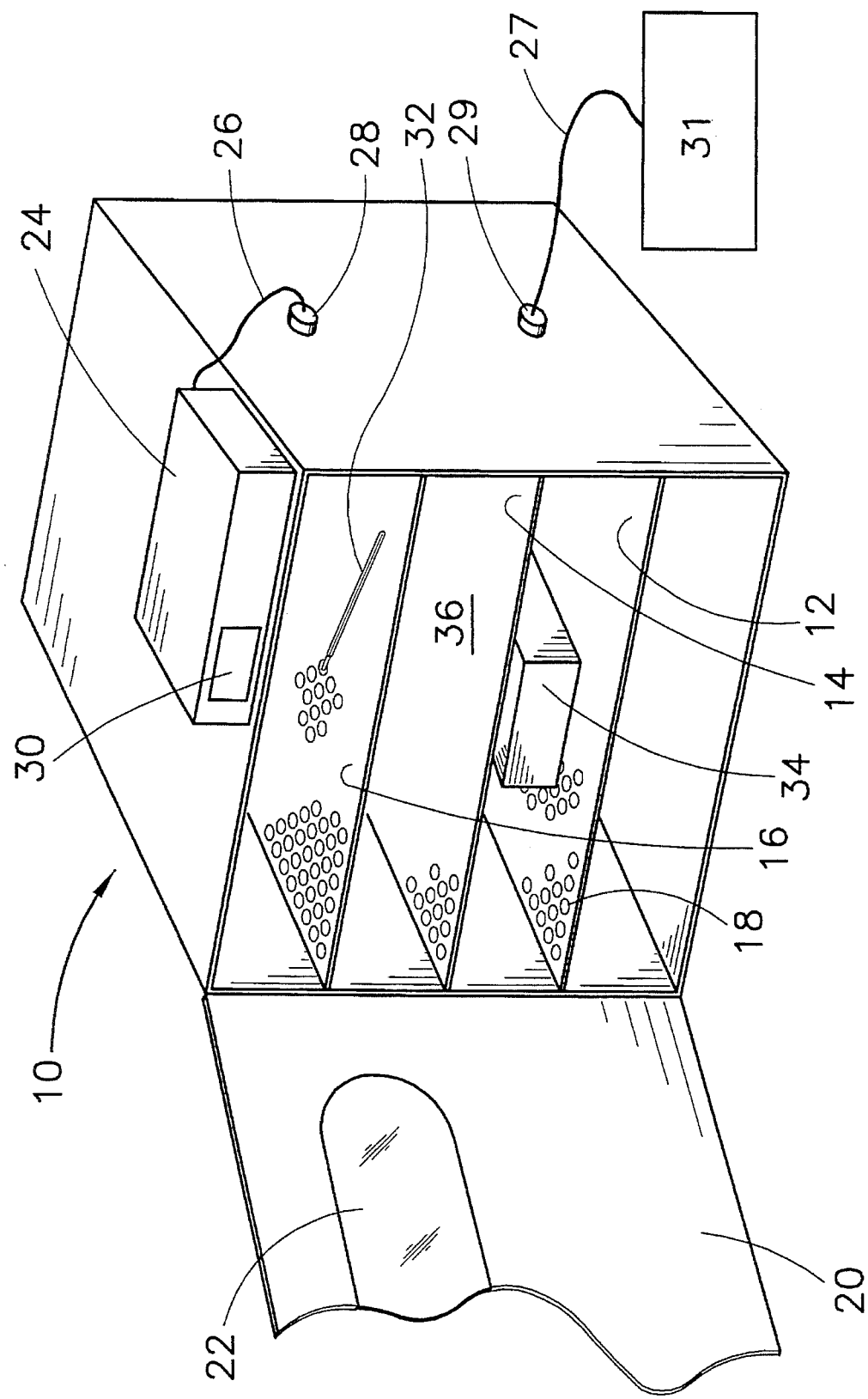
FIG. 1 is a perspective view of one type of device which may be tested by the method of this invention.

The following description is intended to refer to the specific embodiments of the invention illustrated in the drawings. This description is not intended to define or limit the scope of the invention, which is defined separately in the claims that follow.

Referring to FIG. 1, the numeral "10" generally designates just one of the many forms of heating or cooling devices that can be tested using a method according to this invention.

Device 10 has a lower shelf 12, a middle shelf 14, and an upper shelf 16. Each of shelves 12, 14, and 16 is provided with perforations 18 to permit air circulation between the shelves. Device 10 also has a door 20 with a window 22.

On top of device 10 is mounted a temperature controller unit 24 which is connected by a wire 26 to a temperature sensor 28. Although device 10 has a single controller unit 24 and a single sensor 28, device 10 optionally has any number of controllers connected to any number of sensors mounted in any combination of locations. Temperature sensor 28 is preferably a thermocouple but is optionally replaced with any known temperature measurement device.

Temperature display 30 is optionally provided on temperature controller unit 24 to display the output from temperature sensor 28. Alternatively, temperature is optionally displayed at a location remote from unit 24 and device 10.

An independent temperature-monitoring unit 31 is connected by a wire 27 to a temperature sensor 29 mounted in a wall of device 10. Unit 31 includes a remote or local display of the temperature measured by sensor 29. The display (not shown) is optionally a CRT screen, a computer print-out, an alarm or any other known recording or display device. Monitoring unit 31 continuously monitors the temperature within device 10.

A standardized temperature sensor 32 is shown on upper shelf 16, but is optionally positioned anywhere or made a part of device 10. In this embodiment, sensor 32 is a thermometer positioned on shelf 16 for visibility through window 22. Sensor 32 is preferably positioned with the thermometer bulb over a perforation 18 in upper shelf 16. Standardized temperature sensor 32 is optionally replaced with a thermocouple or any other known temperature-sensing device.

The numeral "36" designates a temperature-controlled and temperature-monitored environment within device 10. During operation of device 10, environment 36 is isolated from the ambient atmosphere. However, it is contemplated that the temperature-controlled and temperature-monitored environment may be exposed to ambient atmosphere in other devices.

The numeral "34" designates a thermal mass. Thermal mass 34 is optionally a container holding a liquid or, alternatively, merely a solid or semi-solid mass. In fact, thermal mass 34 can be any object or material whatsoever so long as it can be heated or cooled and placed within the temperature-controlled and monitored environment of a heating or cooling device. Thermal mass 34 is also optionally any number of objects, depending upon the size of the objects and the temperature range of the device to be tested. The temperature of thermal mass 34 is preferably measurable by conventional means.

Device 10 also has heat transfer means (not shown) connected to temperature controller unit 24 and positioned to heat and/or cool environment 36 of device 10. Heat transfer means is any means capable of heating, cooling or maintaining a constant temperature in environment 36. For example, heat transfer means is optionally heating or cooling coils for circulation of heat transfer fluids, electrical heating elements, blowers, burners, or any other known heat transfer means or combination thereof.

Temperature control unit 24 of device 10 is calibrated to maintain a pre-determined target temperature ($T_{target}$) within a pre-determined temperature tolerance. $T_{target}$ and the pre-determined temperature tolerance define a target temperature range with a minimum temperature limit $T_{min}$ and a maximum temperature limit $T_{max}$.

When the temperature within environment 36 of device 10 falls below $T_{min}$, an alarm condition is indicated by temperature monitor 31 in any known manner, including a visual alarm, audio alarm or digital or other display. An alarm condition also results if $T_{max}$ is exceeded.

Figure 2:
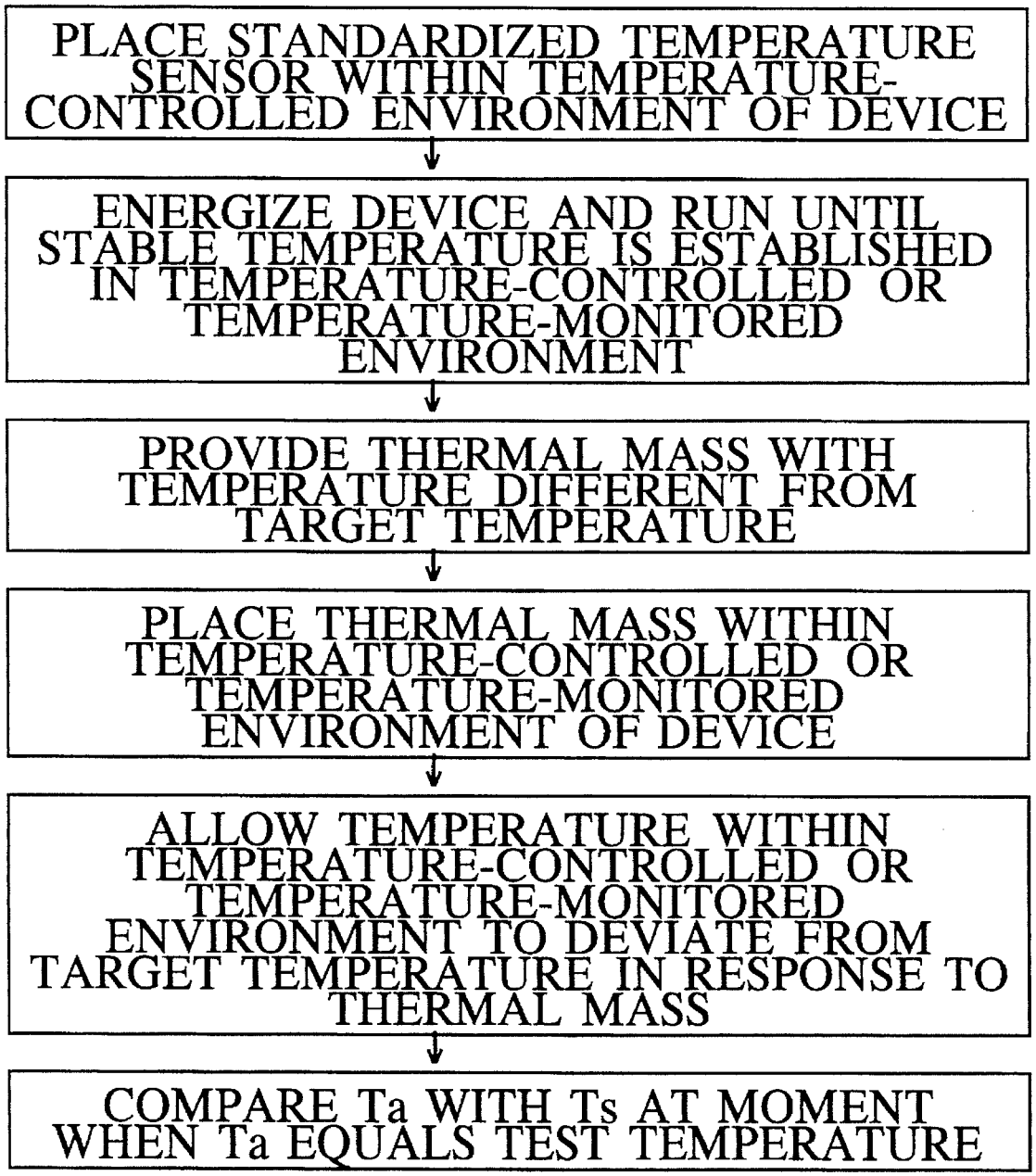
FIG. 2 is a flow diagram illustrating the steps of one embodiment of the method according to this invention.

FIG. 2 illustrates, in flow-diagram format, the steps of one embodiment of the method according to this invention. This validation method embodiment is initiated by placing a standardized temperature sensor within the temperature-controlled or temperature-monitored environment of a heating or cooling device. Referring to FIG. 1 for example, standardized thermometer 32 is placed on top shelf 16 of device 10, locating the thermometer bulb directly over a perforation 18.

The next step is to energize the heating or cooling device and run the device until a stable temperature is established in the temperature-controlled or temperature-monitored environment. The time required to establish a stable temperature varies depending upon the nature of the device as well as the magnitude and precision of the target temperature to be achieved. The target temperature is optionally a target temperature range. Referring to FIG. 1 for illustration, device 10 is turned on and allowed to run until a substantially stable temperature is achieved within environment 36. A set warm-up period of, for example, 30 minutes or any other suitable warm-up period is optionally established. Alternatively, an operator of device 10 optionally monitors the temperature until an equilibrium is established within pre-determined guidelines.

The next step is to provide a thermal mass with a temperature different from the pre-determined target temperature. This may be accomplished in any known manner, depending upon the nature of the specific thermal mass selected as well as the magnitude of the target temperature. For example, a thermal mass may be exposed to freezing temperatures, elevated temperatures, pressure differentials, chemical reactions or any other known process capable of heating and/or cooling the mass. As per example, thermal mass 34 shown in FIG. 1 is optionally placed in an oven and heated to an elevated temperature or, conversely, it is optionally exposed to dry ice or another cold temperature source to decrease its temperature. Also, less dramatic thermal gradients are optionally applied simply by placing the mass in an ice-water bath or a warm-water bath.

The next step of the method embodiment illustrated in FIG. 2 is to place the thermal mass within the temperature-controlled or temperature-monitored environment of the device. As shown in FIG. 1, thermal mass 34 is placed within environment 36 of device 10, preferably in the center of lower shelf 12, and door 20 is closed.

The temperature within the device is then allowed to warm or cool in response to the thermal mass until it deviates from the target temperature. This optionally occurs when the temperature within the device deviates from a target temperature range by exceeding $T_{max}$ or falling below $T_{min}$. This temperature change preferably occurs at a slow rate so that the temperature can be accurately and continuously monitored or controlled. As the temperature within the temperature-controlled or temperature-monitored environment changes in response to the thermal mass, the temperature ($T_s$) is reported by the standardized temperature sensor and the temperature ($T_a$) is reported by the temperature sensor of the temperature-controlling or temperature-monitoring system. Referring to FIG. 1 for illustration, display 30 of controller 24 reports temperature $T_a$ sensed by sensor 28 while standardized thermometer 32 reports temperature $T_s$. Alternatively, temperature monitor 31 reports temperature $T_a$ sensed by sensor 29 while standardized thermometer 32 reports temperature $T_s$.

When temperature $T_a$ reported by the temperature controller or monitor temperature sensor or sensors is equal to a test temperature, comparison is made between $T_a$ and temperature $T_s$ reported by the standardized temperature sensor. "Test temperature" means each specific temperature at which a specific sensor is being tested. This may be $T_{min}$, $T_{max}$, $T_{target}$, or any other temperature or temperatures at which sensor calibration is to be validated. Referring to FIG. 1, at the moment when the temperature within environment 36 of device 10 reaches a test temperature, a comparison is performed between temperature $T_a$ reported by sensor 28 or sensor 29 and temperature $T_s$ reported by thermometer 32. If $T_a$ corresponds to $T_s$ within a pre-determined tolerance, the validation process is complete for that test temperature. It is also contemplated that the comparison between $T_a$ and $T_s$ is made when $T_s$, not $T_a$, equals the test temperature.

Figure 3:
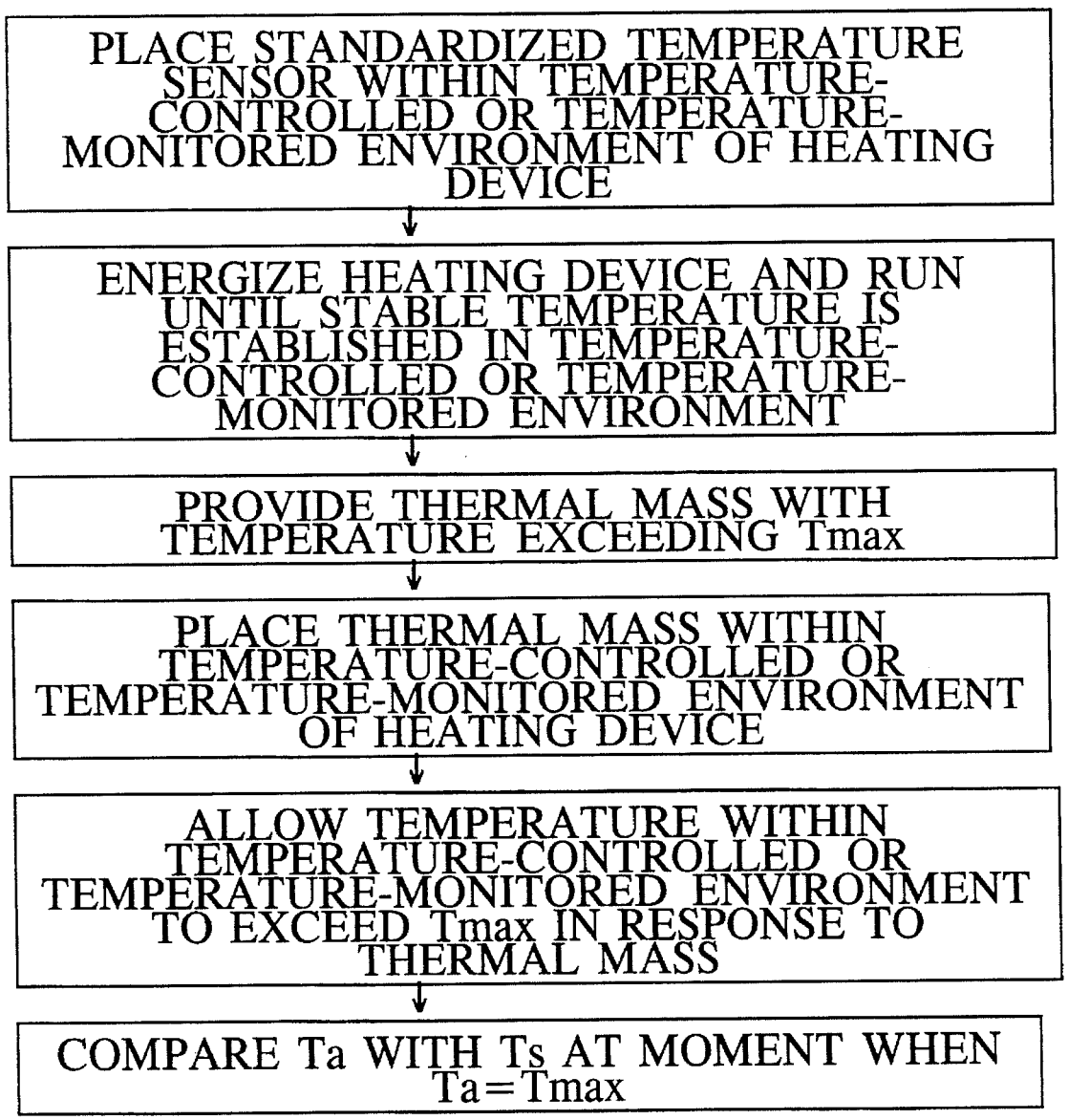
FIG. 3 is a flow diagram illustrating the steps of an embodiment of the method adapted for testing a maximum temperature limit.

FIG. 3 illustrates another embodiment of the method according to this invention. This embodiment is adapted for testing temperature sensor, monitor or controller performance at a maximum temperature limit $T_{max}$ in a heating device such as, for example, an oven. This method embodiment is similar to that shown in FIG. 2. In this embodiment, the thermal mass is specifically provided with a temperature exceeding $T_{max}$. After placing the heated thermal mass in the temperature-controlled or temperature-monitored environment of the heating device, the temperature within the environment is allowed to exceed $T_{max}$ in response to the thermal mass. Finally, a comparison is made between $T_a$ and $T_s$ at the moment when $T_a$ (or $T_s$) equals $T_{max}$.

Figure 4:
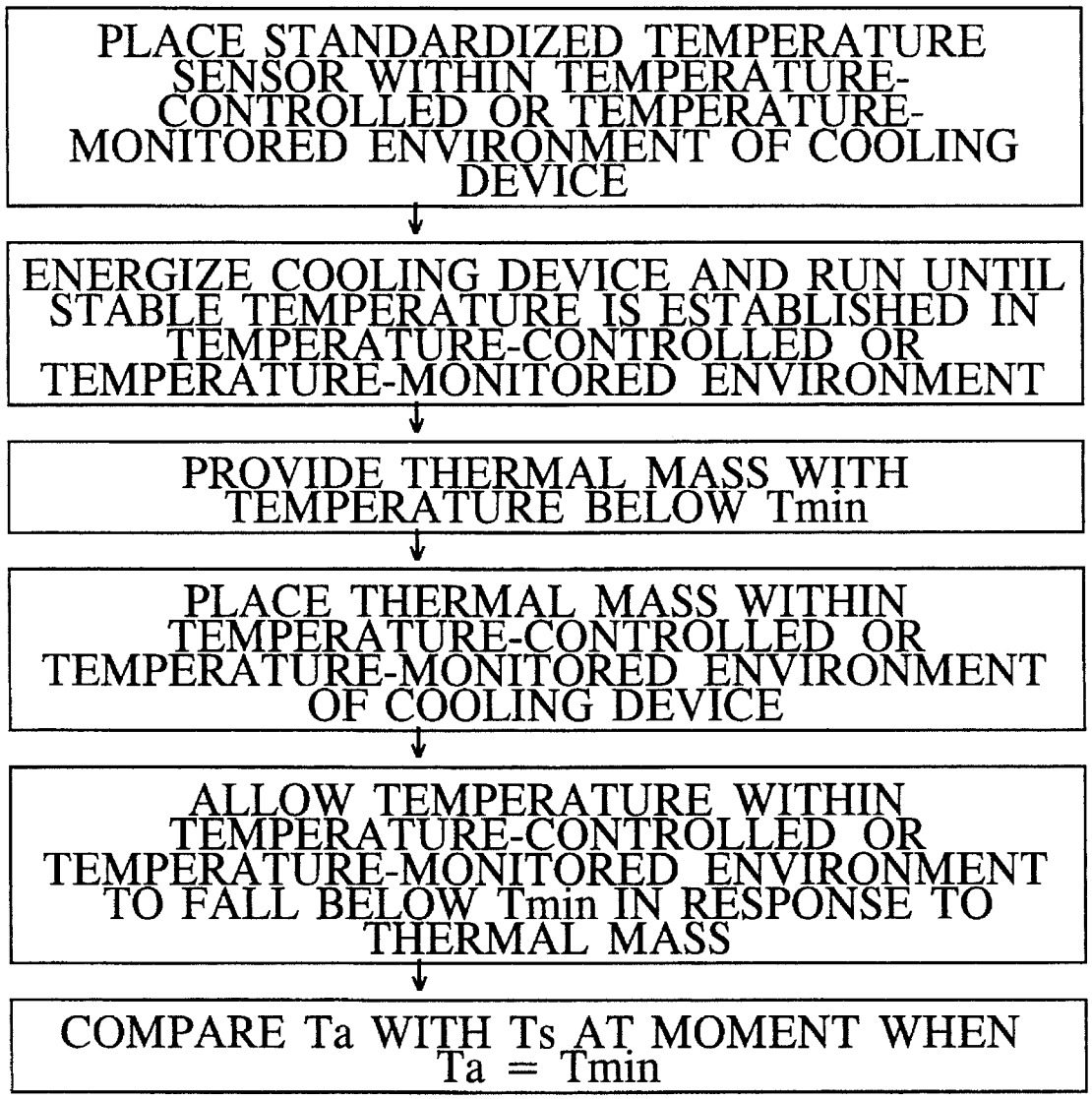
FIG. 4 is a flow diagram illustrating the steps of an embodiment of the method adapted for testing a minimum temperature limit.

FIG. 4 illustrates the steps of a method embodiment adapted specifically to test sensor, monitor or controller performance at a minimum temperature limit $T_{min}$ in a cooling device. This method embodiment is also similar to the method described with reference to FIG. 2. In this embodiment, the thermal mass is provided with a temperature below $T_{min}$. After placing the cooled thermal mass in the temperature-controlled or temperature-monitored environment of the cooling device, the temperature within the environment is allowed to fall below $T_{min}$ in response to the thermal mass. Finally, when $T_a$ (or $T_s$) equals $T_{min}$, a comparison is made between $T_a$ and $T_s$.

FIG. 5 illustrates yet another embodiment, this embodiment being adapted to validate sensor, monitor or controller operation at both minimum and maximum temperature limits $T_{min}$ and $T_{max}$ in a heating device. This method embodiment validates sensor, monitor or controller operation at $T_{max}$ in a manner identical to that described with reference to FIG. 3. However, before the thermal mass is heated and placed in the heating device, the heating device is de-energized until the temperature within the environment falls below $T_{min}$. When $T_a$ (or $T_s$) equals $T_{min}$, a comparison is made between $T_a$ and $T_s$ to determine whether the sensor, monitor or controller is operating within tolerance. The heating device is then re-energized and run until a stable temperature is established before introducing the heated thermal mass.

FIG. 6 is still another embodiment, this method embodiment being adapted to test sensor, monitor or controller operation at $T_{min}$ and $T_{max}$ in a cooling device. $T_{min}$ is tested in a manner identical to that described with reference to FIG. 4. However, before the thermal mass is introduced into the cooling device, the device is de-energized until the temperature within the device rises and exceeds $T_{max}$. A comparison is made between $T_a$ and $T_s$ at the moment when $T_a$ (or $T_s$) equals $T_{max}$. The cooling device is then re-energized and run until a stable temperature is achieved before the cooled thermal mass is introduced.

Figure 7:
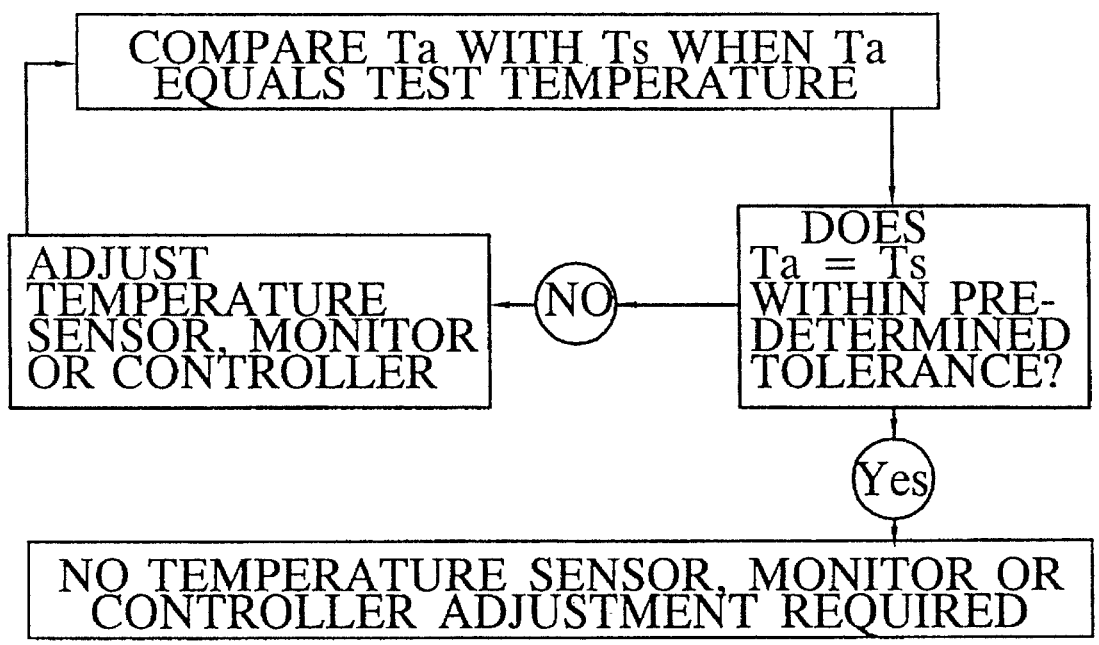
FIG. 7 is a flow diagram illustrating the steps of an embodiment of a method for adjusting a temperature sensor of a temperature-controlling or temperature-monitoring system.

FIG. 7 shows a sub-procedure for adjusting, calibrating or re-calibrating a temperature sensor, monitor or controller based on comparison between $T_a$ and $T_s$ when $T_a$ (or $T_s$) equals a selected test temperature. As shown in FIG. 7, when $T_a$ equals $T_s$ within a pre-determined tolerance, no adjustment or calibration is required and validation at that test temperature is complete. If, however, $T_a$ is not within the pre-determined tolerance of $T_s$, then the sensor, monitor or controller is out of calibration for that test temperature and must be adjusted or recalibrated. After such adjustment or calibration, comparison between $T_a$ and $T_s$ when $T_a$ (or $T_s$) equals the test temperature is repeated until $T_a$ is within tolerance.

The following Example illustrates a test performed according to the method of this invention. This Example is not intended to define or limit the scope of the invention, which is defined separately in the claims that follow.

EXAMPLE

Figure 8:
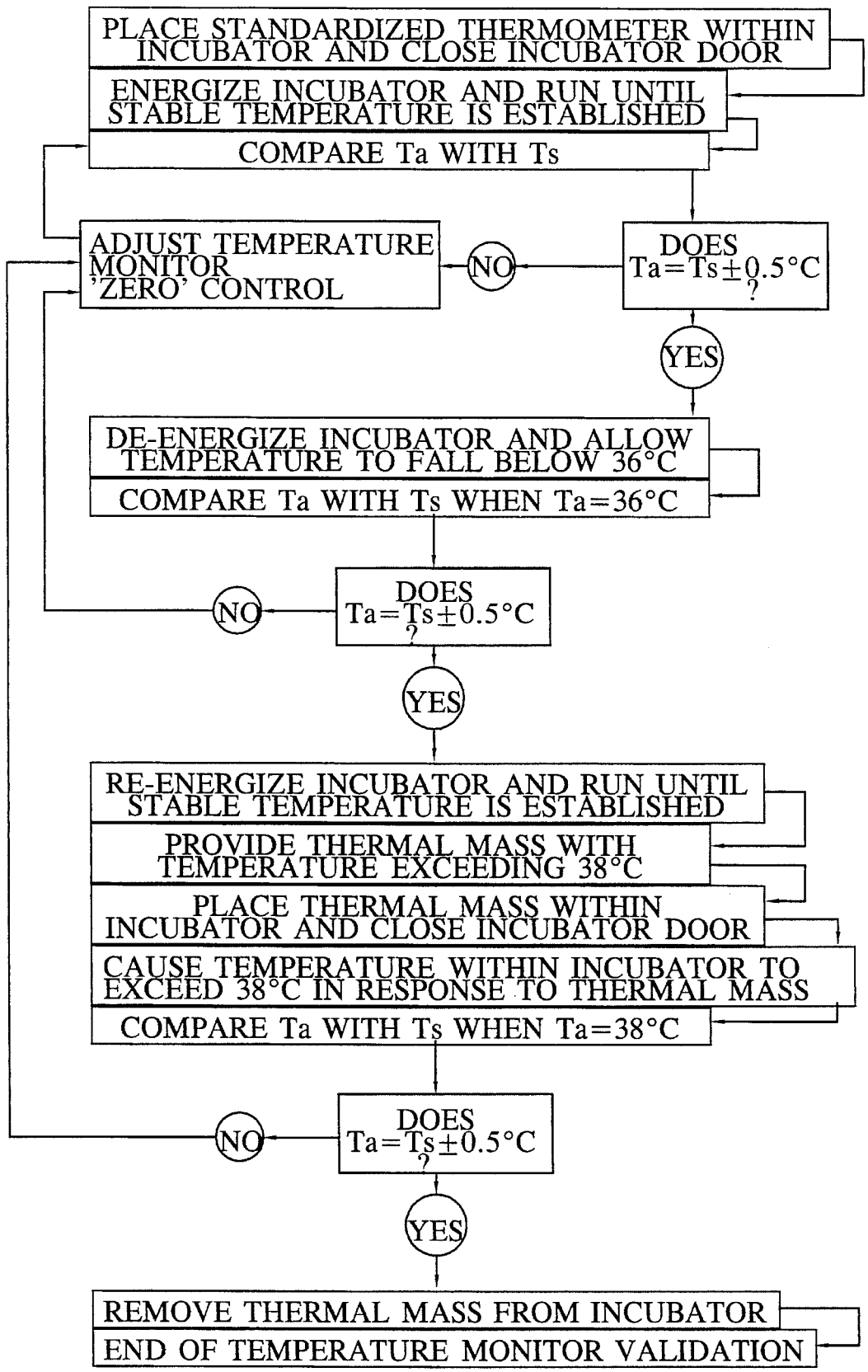
FIG. 8 is a flow diagram illustrating the steps of an embodiment of the method adapted for calibrating minimum and maximum temperature limits of a heating device.

An example of a specific embodiment of the method according to this invention was performed in accordance with the steps illustrated in FIG. 8. The procedure was performed to validate the calibration of a temperature-monitoring system used in conjunction with an incubator. The incubator was an ELISA Incubator supplied by Ortho-Diagnostics, Rariton, N.J. The ELISA Incubator is a precision-controlled oven calibrated to maintain an elevated target temperature of 37° C. within a tolerance of ±1° C. Accordingly, the ELISA incubator maintains a critical temperature range having a minimum temperature limit $T_{min}$ of 36° C. and a maximum temperature limit $T_{max}$ of 38° C.

It is desirable to periodically or continuously monitor the temperature within the ELISA Incubator to ensure continued, accurate performance. In fact, FDA regulations often require continuous monitoring of incubators such as the ELISA Incubator.

The ELISA incubator was provided with a LABLINK temperature monitoring system, supplied by Mack Information Systems, Inc., Wyncote, Pa. The LABLINK temperature monitoring system includes a temperature sensor positioned within the ELISA Incubator. The temperature detected by the LABLINK sensor was recorded and reported on a LABLINK display screen, also supplied by Mack Information Systems.

Referring to the steps illustrated in FIG. 8, a mercury thermometer was provided as a standardized temperature sensor and was placed on the top shelf of the ELISA Incubator with the thermometer bulb over a perforation in the shelf. The incubator was then energized and run for about 30 minutes until a stable temperature was achieved.

After the stable temperature was established, the temperature reported on the LABLINK display screen was compared to the temperature reported by the standardized thermometer to ensure agreement within a tolerance of ±0.5° C. If the temperatures did not agree within ±0.5° C., then the "ZERO" control of the LABLINK sensor was adjusted until its output was within tolerance.

The incubator was then turned off, leaving the incubator door closed, and the incubator was allowed to cool slowly until the temperature fell below 36° C. and the LABLINK display screen reported a low temperature alarm. The temperature reported by the standardized thermometer was compared to the temperature reported by the LABLINK display screen when the LABLINK display screen reported a low temperature alarm. If the temperatures did not agree within a tolerance of ±0.5° C., then the "ZERO" control of the LABLINK sensor was adjusted until its output was within tolerance.

The incubator was then turned on and allowed to stabilize. Two plastic humidity trays (provided with the ELISA Incubator) each were filled with about 16 ounces of water. The water-filled containers were heated in a microwave oven to a temperature of about 80° C. (approximately 5 minutes in a 900 Watt oven) and were then covered to prevent water vapors from condensing on the standardized thermometer and the LABLINK sensor. The heated, covered containers were then placed in the incubator on the two bottom shelves, after which the door was closed.

The temperature within the incubator was caused to increase in response to the heated thermal mass. After a period of about 2–3 minutes, it was noted that the temperature within the incubator exceeded 38° C., the high temperature alarm level.

The temperature reported by the standardized thermometer was compared to the temperature reported by the LABLINK display screen when the LABLINK display screen reported a high temperature alarm. If the temperatures did not agree within a tolerance of ±0.5° C., then the "ZERO" control of the LABLINK sensor was adjusted until its output was within tolerance.

This temperature monitoring system validation and calibration procedure provided accurate and efficient sensor validation and adjustment under actual process conditions.

Although the method of this invention has been described with reference to specific drawings and specific embodiments, it is contemplated that many modifications are optionally made to the method and that the method is optionally used to test and/or calibrate a wide variety of temperature-controlling and temperature-monitoring systems. The heating or cooling devices utilizing these systems optionally maintain a constant temperature or temperature range at, above or below ambient temperature or cycle between high and low temperatures. Also, the method of this invention is optionally used to validate and/or calibrate any number of temperature sensors, each having any number of set-point temperatures.

It is also contemplated that the structure of the heating or cooling device optionally varies radically from that of device 10 shown in FIG. 1. The device is any apparatus that impacts the temperature of a given material or environment. For example, the temperature-controlling device is optionally open to the ambient environment on one or more sides such as a heat lamp and optionally has a cylindrical shape or any other configuration. The device is also optionally a temperature-controlled bath of liquid or semi-solid. Also, temperature is optionally controlled by any form of heat transfer, including convection, radiation, conduction or any combination thereof.

What is claimed is:

1. A method for in situ testing of a temperature sensor at a test temperature, wherein said temperature sensor is positioned to measure a sensed temperature of a temperature-controlled environment that is intended to be maintained at a target temperature during normal operation of said temperature-controlled environment, said method comprising the steps of:

(a) using said temperature sensor to measure said sensed temperature of said temperature-controlled environment under normal operating conditions;

(b) placing a standardized temperature sensor within said temperature-controlled environment to measure an actual temperature within said temperature-controlled environment;

(c) providing a thermal mass sized and shaped to fit within said temperature-controlled environment;

(d) providing said thermal mass with a temperature different from said target temperature;

(e) placing said thermal mass within said temperature-controlled environment;

(f) causing said actual temperature of said temperature-controlled environment to deviate from said target temperature in response to said thermal mass; and (g) comparing said sensed temperature measured by said temperature sensor with said actual temperature measured by said standardized temperature sensor at a moment when said actual temperature or said sensed temperature of said temperature-controlled environment corresponds to said test temperature.

2. The method described in claim 1, wherein said temperature sensor is connected to a temperature controller having the capacity to maintain said target temperature within said temperature-controlled environment and to a heat transfer means positioned in heat transfer relationship with said temperature-controlled environment for transferring heat to or from said temperature-controlled environment.

3. The method described in claim 1, wherein said temperature sensor is connected to a temperature monitor having the capacity to monitor said sensed temperature within said temperature-controlled environment and to a means for indicating said sensed temperature in said temperature-controlled environment.

4. The method described in claim 1, wherein said thermal mass is provided with a temperature above said target temperature and said test temperature is a maximum temperature limit of said target temperature.

5. The method described in claim 2, further comprising the steps, before said thermal mass is placed in said temperature-controlled environment, of de-energizing said temperature controller, causing said actual temperature of said temperature-controlled environment to deviate from said target temperature, and comparing said sensed temperature reported by said temperature sensor to said actual temperature reported by said standardized temperature sensor at a moment when said actual temperature or said sensed temperature of said temperature-controlled environment corresponds to said test temperature.

6. The method described in claim 5, further comprising the step of comparing said sensed temperature reported by said temperature sensor with said actual temperature reported by said standardized temperature sensor after causing said temperature controller to establish a stable temperature in said temperature-controlled environment but before said thermal mass is placed in said temperature-controlled environment.

7. The method described in claim 1, wherein said thermal mass is provided with a temperature below said target temperature and said test temperature is a minimum temperature limit of said target temperature.

8. The method described in claim 1, wherein said standardized temperature sensor is selected from the group consisting of a thermometer and a thermocouple.

9. The method described in claim 1, wherein said thermal mass includes a solid or semi-solid mass.

10. The method described in claim 1, wherein said thermal mass includes a container holding a liquid.

11. The method described in claim 1, wherein an incubator defines said temperature-controlled environment.

12. The method described in claim 11, wherein said target temperature is 37° C. ±1.0° C.

13. The method described in claim 1, wherein said test temperature is a temperature limit defined by said target temperature and a pre-determined temperature tolerance.

14. A method for validating at a test temperature a temperature monitoring system in situ, said temperature monitoring system having a temperature sensor positioned to measure a sensed temperature in a temperature-controlled environment of a temperature-controlling device, said temperature-controlling device having a temperature controller connected to said temperature-controlling device for maintaining a target temperature in said temperature-controlled environment, said method comprising the steps of:

(a) using said temperature monitoring system to monitor said sensed temperature in said temperature-controlled environment under normal operating conditions;

(b) positioning a standardized temperature sensor to measure an actual temperature within said temperature-controlled environment;

(c) providing a thermal mass having a temperature different from said target temperature;

(d) placing said thermal mass within said temperature-controlled environment and causing said actual temperature of said temperature-controlled environment to deviate from said target temperature in response to said thermal mass; and (e) comparing said sensed temperature measured by said temperature sensor with said actual temperature measured by said standardized temperature sensor when said actual temperature or said sensed temperature of said temperature-controlled environment corresponds to said test temperature.

15. A method for calibrating at a test temperature a temperature monitor of a temperature-controlling device in situ, said temperature-controlling device having a controller connected to said temperature-controlling device for maintaining a target temperature within a temperature-controlled environment of said temperature-controlling device and said temperature monitor having a temperature sensor for sensing a sensed temperature within said temperature-controlled environment and a sensed temperature indicator, said method comprising the steps of:

(a) using said temperature monitor to monitor said sensed temperature within said temperature-controlled environment under normal operating conditions;

(b) positioning a standardized temperature sensor to sense an actual temperature within said temperature-controlled environment;

(c) providing a thermal mass having a temperature different from said target temperature;

(d) placing said thermal mass within said temperature-controlled environment and causing said actual temperature of said temperature-controlled environment to deviate from said target temperature in response to said thermal mass;

(e) comparing said sensed temperature reported by said sensed temperature indicator of said temperature monitor with said actual temperature sensed by said standardized temperature sensor when said actual temperature or said sensed temperature of said temperature-controlled environment corresponds to said test temperature; and (f) calibrating said temperature monitor if said actual and sensed temperatures do not correspond to one another within a pre-determined tolerance.

16. The method described in claim 15, further comprising the step of removing said thermal mass from said temperature-controlled environment and repeating steps (c) through (f) until said actual and sensed temperatures correspond to one another within said pre-determined tolerance.

17. A method for in situ testing of a temperature sensor at a test temperature, said temperature sensor being connected to a device having a temperature-monitored environment and means providing access to said temperature-monitored environment, said temperature sensor being positioned to measure a sensed temperature of said temperature-monitored environment, wherein said temperature-monitored environment is intended to have a target temperature during normal operation of said device, said method comprising the steps of:

(a) using said device and said temperature sensor to measure said sensed temperature of said temperature-monitored environment under normal operating conditions;

(b) inserting a standardized temperature sensor through said means providing access and into said temperature-monitored environment of said device;

(c) measuring an actual temperature within said temperature-monitored environment with said standardized temperature sensor;

(d) providing a thermal mass sized and shaped to fit through said means providing access and within said temperature-monitored environment;

(e) providing said thermal mass with a temperature different from said target temperature;

(f) inserting said thermal mass through said means providing access and into said temperature-monitored environment;

(g) causing said actual temperature within said temperature-monitored environment to deviate from said target temperature in response to said thermal mass; and (h) comparing said sensed temperature measured by said temperature sensor with said actual temperature measured by said standardized temperature sensor at a moment when said actual temperature or said sensed temperature of said temperature-monitored environment corresponds to said test temperature.

18. A method for in situ testing of a temperature sensor at a designated test temperature, wherein said temperature sensor senses a temperature existing within an operating environment having an operating temperature, said method comprising the steps of:

(a) placing a standardized temperature sensor within said operating environment;

(b) providing a thermal mass sized and shaped to fit within said operating environment;

(c) providing said thermal mass with a temperature different from said operating temperature;

(d) placing said thermal mass within said operating environment, thereby changing said temperature existing within said operating environment to a deviated temperature which differs from said operating temperature in response to the influence of said thermal mass; and (e) at said deviated temperature, comparing a sensed temperature indication provided by said temperature sensor with a standardized temperature indication provided by said standardized temperature sensor.

* * * * *